United States Patent
Ramachandra et al.

(10) Patent No.: US 11,659,458 B2
(45) Date of Patent: *May 23, 2023

(54) CELL RE-SELECTION MEASUREMENT WINDOW IN NEW RADIO

(71) Applicant: TELEFONAKTIEBOLAGET LM ERICSSON (PUBL), Stockholm (SE)

(72) Inventors: Pradeepa Ramachandra, Linköping (SE); Wei Shen, Linköping (SE); Johan Rune, Lidingö (SE); Henrik Sahlin, Mölnlycke (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,564

(22) Filed: Sep. 3, 2021

(65) Prior Publication Data
US 2021/0400546 A1   Dec. 23, 2021

Related U.S. Application Data

(63) Continuation of application No. 16/496,733, filed as application No. PCT/IB2018/051996 on Mar. 23, 2018, now Pat. No. 11,146,999.
(Continued)

(51) Int. Cl.
*H04W 36/00* (2009.01)
*H04W 36/08* (2009.01)
(Continued)

(52) U.S. Cl.
CPC ... *H04W 36/0088* (2013.01); *H04W 36/0058* (2018.08); *H04W 36/08* (2013.01);
(Continued)

(58) Field of Classification Search
CPC ............ H04W 16/0088; H04W 76/27; H04W 36/0058; H04W 36/08; H04W 48/16;
(Continued)

(56) References Cited

U.S. PATENT DOCUMENTS

2007/0082674 A1* 4/2007 Pedersen ................ H04B 7/026
                                                         455/450
2013/0176978 A1   7/2013 Abe
(Continued)

FOREIGN PATENT DOCUMENTS

CN        106165323 A    11/2016
CN        106304273 A     1/2017
(Continued)

OTHER PUBLICATIONS

Ericsson, "Beamforming of idle and connected mode signals", 3GPP TSG-RAN WG2 #96, Reno, Nevada, USA, Nov. 14-18, 2016, pp. 1-6, Tdoc R2-168726, 3GPP.
(Continued)

*Primary Examiner* — Mewale A Ambaye

(57) ABSTRACT

A radio network node, such as a gNodeB (gNB), a User Equipment (UE) and a method, for configuring the UE for camping on a cell in a radio network for Synchronization Signal (SS) Blocks based cell re-selection measurements for RRC_IDLE and RRC_INACTIVE states. The method comprises providing information to the UE, including configuration parameters for a measurement window, the configuration parameters defining a window periodicity, offset and duration, for configuring the UE for the SS Blocks based cell re-selection measurements for RRC_IDLE and RRC_INACTIVE states. Radio Resource Control (RRC) signaling is used to convey the information to the UE prior to or in conjunction with switching the UE from RRC_CONNECTED state to RRC_INACTIVE or RRC_IDLE state, a RRCConnectionRelease message is used to convey the
(Continued)

information to the UE and the information is also provided to the UE in system information (SI).

34 Claims, 13 Drawing Sheets

Related U.S. Application Data

(60) Provisional application No. 62/476,561, filed on Mar. 24, 2017.

(51) Int. Cl.
*H04W 48/16* (2009.01)
*H04W 76/27* (2018.01)
*H04W 56/00* (2009.01)

(52) U.S. Cl.
CPC ......... *H04W 48/16* (2013.01); *H04W 56/001* (2013.01); *H04W 76/27* (2018.02)

(58) Field of Classification Search
CPC ... H04W 56/001; H04W 24/10; H04W 52/02; H04B 1/7075
See application file for complete search history.

(56) References Cited

U.S. PATENT DOCUMENTS

| | | | |
|---|---|---|---|
| 2016/0073366 A1 | 3/2016 | Ng | |
| 2016/0381681 A1 | 12/2016 | Nogami | |
| 2017/0070312 A1 | 3/2017 | Yi et al. | |
| 2017/0223667 A1 | 8/2017 | Yi | |
| 2017/0331670 A1 | 11/2017 | Parkvall | |
| 2017/0366992 A1 | 12/2017 | Rune | |
| 2018/0115990 A1* | 4/2018 | Abedini | H04L 5/0053 |
| 2018/0279238 A1 | 9/2018 | Zhou | |
| 2018/0343156 A1* | 11/2018 | Malik | H04J 11/0073 |
| 2019/0007933 A1 | 1/2019 | Yi | |
| 2019/0053174 A1 | 2/2019 | Nangia | |
| 2019/0053176 A1 | 2/2019 | Lee | |
| 2019/0074886 A1 | 3/2019 | Yoon | |
| 2019/0098520 A1 | 3/2019 | Kim | |
| 2019/0159226 A1 | 5/2019 | Ly | |
| 2020/0119800 A1 | 4/2020 | Rune | |
| 2020/0162939 A1* | 5/2020 | Kim | H04W 56/001 |
| 2021/0083730 A1* | 3/2021 | Hwang | H04B 17/309 |
| 2021/0105788 A1* | 4/2021 | Kim | H04W 72/0406 |

FOREIGN PATENT DOCUMENTS

| | | |
|---|---|---|
| CN | 106332231 A | 1/2017 |
| EP | 2241130 B1 | 10/2010 |
| EP | 2733982 A1 | 5/2014 |
| RU | 2488238 C2 | 7/2013 |
| WO | 2015109153 A1 | 7/2015 |
| WO | 2015133823 A1 | 9/2015 |
| WO | 2016084865 A1 | 6/2016 |
| WO | 2017014229 A1 | 1/2017 |
| WO | 2018172996 A1 | 9/2018 |

OTHER PUBLICATIONS

Ericsson, "Higher layer implications of beamforming during random access", 3GPP TSG-RAN WG2 No. 97, Tdoc R-1700881, Athens, Greece, Feb. 13-17, 2017.

LG Electronics, "Cell identification in NR", 3GPP TSG-RAN WG4 Meeting #82, Athens, Greece, Feb. 13-17, 2017, R4-1700860, pp. 1-6, 3GPP.

Nokia et al., "Mobility Measurements in Idle and Inactive Mode", 3GPP TSG-RAN WG2 Meeting #97, Athens, Greece, Feb. 13-17, 2017, pp. 1-6, R2-1700168, 3GPP.

NTT DoCoMo, Inc., "Discussion on mobility procedure for NR", 3GPP TSG RAN WG1 Meeting #88, Athens, Greece, Feb. 13-17, 2017, pp. 1-6, R1-1702833, 3GPP.

* cited by examiner

CELL RE-SELECTION MEASUREMENT WINDOW IN NEW RADIO

PRIORITY STATEMENT UNDER 35 U.S.C. S.119(E) & 37 C.F.R. S.1.78

This non-provisional patent application claims priority based upon the prior U.S. provisional patent application entitled "Cell Re-Selection Measurement Window in New Radio", application No. 62/476,561, filed Mar. 24, 2017, in the names of RAMACHANDRA, Pradeepa, SHEN, Wei, RUNE, Johan and SAHLIN, Henrik, and claims benefit of non-provisional patent application, application Ser. No. 16/496,733, entitled "Cell Re-Selection Measurement Window in New Radio", with a filing date of Mar. 23, 2018.

TECHNICAL FIELD

The present disclosure relates, in general, to wireless communications and, more particularly, to cell re-selection measurements in new radio.

BACKGROUND

Due to the scarcity of available spectrum for future mobile, wireless communication systems, spectrum located in very high frequency ranges (compared to the frequencies that have so far been used for wireless communication), such as 10 GHz and above, are planned to be utilized for future mobile communication systems, e.g. 5th Generation (5G), including the 5G system being standardized by 3rd Generation Partnership Project (3GPP), for which the Radio Access Network part is referred to as New Radio (NR) and the core network part is referred to as Next Generation Core (NGC).

For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency. Consequently, if omnidirectional receive and transmit antennas are used, the link budget will be worse for the same link distance even in a free space scenario. This motivates the usage of beamforming to compensate for the loss of link budget, resulting in poor Signal to Noise Ratio (SNR)/Signal to Interference and Noise Radio (SINR), in high frequency spectrum (e.g. >g GHz). Beamforming may be used at the transmitter, at the receiver, or both. In a large part of the spectrum planned for 5G deployments the preferred configuration is to use a large antenna array at the Access Node (AN) (e.g. base station in New Radio (NR) (gNB) (a gNB corresponding to eNB in Long Term Evolution (LTE)), Transmit/Receive Point or Transmission/Reception Point (TRP), Evolved NodeB (eNB)) and a small number of antennas at the User Equipment (UE). Access Node (AN) is a generic term for a node in a cellular network or mobile communications network, serving a radio interface towards wireless terminals using the network. Other terms that may be seen as covered by the generic Access Node term include e.g. eNB, gNB, and TRP. The large antenna array at the AN enables high-order transmit beamforming in the downlink.

For the above reasons, future systems are expected to make heavy use of high-gain, narrow beamforming, which will enable high data rate transmission coverage also to very distant users which would not realistically be covered with normal sector-wide or omnidirectional beams, which have lower antenna gain.

High or medium gain beamforming has traditionally mostly been used to increase the achievable data rates for individual UEs. However, for 5G/NR, beamforming is expected to be used also for common control signaling, i.e. control signal transmissions that are not targeting a specific UE but is intended to be received by all or a group of UEs in the coverage area. Such common control signaling include e.g. synchronization signals, broadcast system information and common reference signals.

These signals, by nature, must reach the entire coverage area that a gNB (or possibly a group of TRPs) is intended to serve, e.g. a cell. To achieve this goal using beamformed transmissions a concept known as beam sweeping may be utilized, whereby the concerned signal is transmitted using sequential transmissions of narrow beams in different directions until the entire coverage area—e.g. cell—is covered. Another way of combating the low SNR/SINR is to use repeated wide (or omnidirectional) beam transmissions, which the UE soft-combines until enough energy has been collected to achieve good enough SNR/SINR to allow decoding of the information.

Synchronization Signals and System Information in NR

Of special interest in the context of the present disclosure are synchronization signals and system information and how these are transmitted in NR. The synchronization signal consists of two or possibly three components:

Primary Synchronization Signal (PSS), also called NR-PSS, which allows for network detection with a high frequency error, up to tens of parts per million (ppm), and also provides a network timing reference.

Secondary Synchronization Signal (SSS), also called NR-SSS, which allows for more accurate frequency adjustments and channel estimation while at the same time providing fundamental network information in the form of a locally unique cell identity, also referred to as the Physical Cell Identity (PCI).

Tertiary Synchronization Signal (TSS), which provides timing information within a cell, e.g. between common control signaling beams transmitted in a cell and/or symbol number indications, e.g. allowing derivation of subframe borders. The existence of the TSS (and its format and specific usage if it is introduced) is still being studied in 3GPP.

Together the PSS, SSS and possibly TSS are referred to as Synchronization Signal (SS).

The Synchronization Signal is transmitted together with a broadcast channel, referred to as Physical Broadcast Channel (PBCH) or NR-PBCH, carrying a small, but essential part of the system information, often referred to as the Master Information Block (MIB).

Together the SS and the PBCH form a structure denoted SS Block (SSB) which is periodically broadcast in a cell. FIG. 1 illustrates a possible format/structure of the SS Block.

The remaining parts of the system information is periodically broadcasted on one or more other channel(s). Some of the system information may not be periodically broadcasted at all, but may instead be requested (and transmitted) on demand.

NR Network (NW) Configuration

Depending on the deployment, beamforming may be used to distribute the SSB over the coverage area of a cell. Multiple SSBs are then aggregated to form an SSB burst where each SSB instance is beamformed in a certain direction, either to ensure coverage or to provide beam finding support for subsequent link establishment.

As mentioned above, for the purpose of improving coverage (or beam finding), the SS Block may be transmitted using beamforming in the form of a beam sweep including multiple beams which together cover the desired area. Another means for improving coverage is repetition of wide (even omnidirectional) beam transmissions. Both beam sweeping and repetition involves multiple transmissions. 3GPP has agreed on a structure for such multiple SS Block transmissions. A number of SS Block transmissions lumped together, i.e. transmitted in a tight series, are generally denoted "SS Burst" in the present specification. The notion of an "SS Burst Set" refers to a set of SS Bursts, typically with some non-zero interval between successive SS Burst transmissions (see FIG. 2, which illustrates the concepts of SS Burst and SS Burst Set). In 3GPP, the SS Blocks referred to herein are called SS/PBCH Blocks. The SS/PBCH Blocks have fixed locations defined in the 3GPP specification. A person skilled in the art would understand that when the expressions "SS Burst" and "SS Burst Set" are used within this specification, these expressions refer or relate to the SS/PBCH Blocks of 3GPP, when appropriate. An SS Burst may, for instance, consist of the beam transmissions of a full beam sweep. However, there may also be reasons for not including a full beam sweep in an SS Burst, for instance if the number of beams in the sweep is comparably high and a full beam sweep would take a longer time than allowed or desired for an SS Burst. In such a case, the beam sweep may be divided into multiple SS Bursts, e.g. forming an SS Burst Set. The periodicity of an SS Burst as well as the recurrence interval of a certain beam in a sweep may be configurable and deployment dependent. All the exact details around these time periods/intervals are not yet decided in 3GPP. Some values that are considered for these time periods include 5, 10, 20, 40, 80 and 160 ms. Different values as well as different configuration possibilities may be decided for different deployment scenarios.

Cell Re-Selection in NR

In addition to the UE energy saving state RRC_IDLE, where RRC stands for Radio Resource Control, which is used in LTE, 3GPP has introduced another energy saving UE state referred to as RRC_INACTIVE state. In RRC_IDLE state the context information related to the UE (the UE context) is deleted in the Radio Access Network (RAN) and the RAN has no knowledge of the UE and the UE's whereabouts. In the RRC_INACTIVE state, on the other hand, the UE context is kept in the RAN (e.g. gNB) and the RAN Core Network (RAN-CN) connection for the concerned UE is kept.

In these two states a UE monitors the relevant control signals from the network, including synchronization signal(s) and system information as well as potential page signaling. When performing such monitoring in a cell the UE is said to be camping on the cell.

A UE in RRC_IDLE or RRC_INACTIVE state constantly or repeatedly evaluates whether it is appropriate to remain camping on the current cell or whether camping on another cell, assumedly a neighbor cell of the current cell, would be better. Switching from camping on one cell to camping on another cell is referred to as "cell re-selection." To assess the suitability of different cells to become (or remain) the cell the UE camps on (e.g. denoted the camping cell), the UE measures on the SS Block transmissions of the current and neighbor cells, in particular the SSS and possibly Demodulation Reference Signal (DMRS) on the PBCH. The signals a UE measures on to assess a cell's suitability and to determine whether cell re-selection should be performed are henceforth referred to as "cell re-selection measurement signals." In addition to the measurements on the cell re-selection measurement signals, the UE may be guided by cell re-selection rules conveyed to the UE via the system information in the camping cell. Such rules may for instance contain thresholds (e.g. in terms of signal strengths or signal qualities) for cell re-selection and hysteresis to prevent a UE from constantly re-selecting between two neighboring cells.

As described above, the periodicity of the signals a camping UE uses for cell re-selection assessment may be quite long, resulting in long measurement periods when the UE monitors the downlink of neighbor cells, blindly searching for signals to measure on. Much of this time, potentially the major part of this time is likely to be wasted because there are no relevant signals transmitted in any of the cells neighboring the UE's current cell. This is costly from a UE energy consumption perspective and hence counteracts the energy-saving purpose of the RRC_IDLE and RRC_INACTIVE states.

SUMMARY

There is provided a method, executed by a radio network node, for configuring a User Equipment (UE) camping on a cell served by the radio network node for Synchronization Signal (SS) Blocks based cell re-selection measurements for RRC_IDLE and RRC_INACTIVE states. The method comprises providing information to the UE, including configuration parameters for a measurement window, the configuration parameters comprising a window periodicity parameter, a window offset parameter and a window duration parameter, for configuring the UE for the SS Blocks based cell re-selection measurements for RRC_IDLE and RRC_INACTIVE states.

The radio network node may be a gNodeB (gNB). The information may be provided to the UE in system information (SI). The window periodicity parameter may have a value equal to a smallest SS Burst Set recurrence period among the cell served by the radio network node and involved neighboring cells. The window periodicity parameter may have a value selected within the group consisting of 5, 10, 20, 40, 80 and 160 milliseconds. The window offset parameter may be smaller than the window periodicity parameter. The window duration parameter may be smaller than or equal to the configured window periodicity parameter. The radio network node may serve at least one cell and the information may be provided to the at least one cell served by the radio network node. There may be repetitive measurement windows covering time intervals when the SS Blocks are transmitted in a vicinity of the UE. The measurement window may cover an SS Burst. The measurement window may cover an SS Burst Set, the window offset may be in relation to the start of the SS Burst Set of a current serving cell and the window duration may be the union of SS Burst Sets of the current serving cell and involved neighboring cells. An SS Burst Set may comprise one SS Burst, and the measurement window may cover the SS Burst. The radio network node may obtain beam sweep configurations of inter-radio network node synchronization accuracy from neighbor radio network nodes. The beam sweep configurations may comprise a number of beams in an SS Burst, a number of SS Bursts in an SS Burst Set, an inter-SS Burst interval, and at least an approximation of an SS Burst Set recurrence period of the neighbor radio network nodes. Configuring the UE may further comprise configuring the measurement window based on the inter-radio network node synchronization accuracy, the number of beams in an SS Burst, the number of SS Bursts in an SS Burst Set, the inter-SS Burst interval, and the SS Burst Set recurrence period of the neighbor radio network nodes. The radio network node may use Radio Resource Control (RRC) signaling to convey the information to the UE prior to or in conjunction with switching the UE from RRC_CONNECTED state to RRC_INACTIVE or RRC_IDLE state. The radio network node may use a RRCConnectionRelease message to convey the information to the UE. The measurement window may be divided in a plurality of sub-windows. The information may comprise further configuration parameters for the measurement window including a sub-window duration parameter and a sub-window repetition periodicity parameter.

There is provided a radio network node operative to configure a User Equipment (UE) camping on a cell served by the radio network node for Synchronization Signal (SS) Blocks based cell re-selection measurements for RRC_IDLE and RRC_INACTIVE states. The radio network node comprises processing circuitry and a memory. The memory contains instructions executable by the processing circuitry whereby the radio network node is operative to provide information to the UE, including configuration parameters for a measurement window, the configuration parameters comprising a window periodicity parameter, a window offset parameter and a window duration parameter, for configuring the UE for the SS Blocks based cell re-selection measurements for RRC_IDLE and RRC_INACTIVE states.

The radio network node may be a gNodeB (gNB). The information provided may be system information (SI). The window periodicity parameter may have a value equal to a smallest SS Burst Set recurrence period among the cell served by the radio network node and involved neighboring cells. The window periodicity parameter may have a value selected within the group consisting of 5, 10, 20, 40, 80 and 160 milliseconds. The window offset parameter may be smaller than the window periodicity parameter. The window duration parameter may be smaller than or equal to the configured window periodicity parameter. The radio network node may further be operative to serve at least one cell and the information may be provided to the at least one cell served by the radio network node. There may be repetitive measurement windows covering time intervals when the SS Blocks are transmitted in a vicinity of the UE. The measurement window may cover an SS Burst. The measurement window may cover an SS Burst Set, the window offset may be in relation to the start of the SS Burst Set of a current serving cell and the window duration may be the union of SS Burst Sets of the current serving cell and involved neighboring cells. An SS Burst Set may comprise one SS Burst, and the measurement window may cover the SS Burst. The radio network node may further be operative to obtain beam sweep configurations of inter-radio network node synchronization accuracy from neighbor radio network nodes. The beam sweep configurations may comprise a number of beams in an SS Burst, a number of SS Bursts in an SS Burst Set, an inter-SS Burst interval, and at least an approximation of an SS Burst Set recurrence period of the neighbor radio network nodes. The radio network node may further be operative to use Radio Resource Control (RRC) signaling to convey the information to the UE prior to or in conjunction with switching the UE from RRC_CONNECTED state to RRC_INACTIVE or RRC_IDLE state. The radio network node may further be operative to use a RRCConnectionRelease message to convey the information to the UE. The measurement window may be divided in a plurality of sub-windows. The information may comprise further configuration parameters for the measurement window including a sub-window duration parameter and a sub-window repetition periodicity parameter.

There is provided a User Equipment (UE) operative to camp on a cell served by a radio network node and to be configured for Synchronization Signal (SS) Blocks based cell re-selection measurements for RRC_IDLE and RRC_INACTIVE states. The UE comprises processing circuitry and a memory. The memory contains instructions executable by the processing circuitry whereby the UE is operative to receive information from the radio network node, including configuration parameters for a measurement window, the configuration parameters comprising a window periodicity parameter, a window offset parameter and a window duration parameter, for configuring the UE for the SS Blocks based cell re-selection measurements for RRC_IDLE and RRC_INACTIVE states.

The radio network node may be a gNodeB (gNB). The information may be received by the UE in system information (SI). The window periodicity parameter may have a value equal to a smallest SS Burst Set recurrence period among the cell served by the radio network node and involved neighboring cells. The window periodicity parameter may have a value selected within the group consisting of 5, 10, 20, 40, 80 and 160 milliseconds. The window offset parameter may be smaller than the window periodicity parameter. The window duration parameter may be smaller than or equal to the configured window periodicity parameter. There may be repetitive measurement windows covering time intervals when the SS Blocks are transmitted in a vicinity of the UE. The measurement window may cover an SS Burst. The measurement window may cover an SS Burst Set, the window offset may be in relation to the start of the SS Burst Set of a current serving cell and the window duration may be the union of SS Burst Sets of the current serving cell and involved neighboring cells. An SS Burst Set may comprise one SS Burst, and the measurement window may cover the SS Burst. The UE may further be operative to be configured by configuring the measurement window based on an inter-radio network node synchronization accuracy, a number of beams in an SS Burst, a number of SS Bursts in an SS Burst Set, an inter-SS Burst interval, and a SS Burst Set recurrence period of neighbor radio network nodes; the inter-radio network node synchronization accuracy, the number of beams in an SS Burst, the number of SS Bursts in an SS Burst Set, the inter-SS Burst interval, and the SS Burst Set recurrence period of the neighbor radio network nodes being provided by the radio network node. The UE may further be operative to receive the information through Radio Resource Control (RRC) signaling from the radio network node prior to or in conjunction with instruction for switching from RRC_CONNECTED state to RRC_INACTIVE or RRC_IDLE state. The UE may further be operative to receive the information through a RRCConnectionRelease message from the radio network node. The measurement window may be divided in a plurality of sub-windows to enable per SS Burst window configuration. The information may comprise further configuration parameters for the measurement window including a sub-window duration parameter and a sub-window repetition periodicity parameter.

DETAILED DESCRIPTION

Particular embodiments serve to reduce the time a camping UE spends monitoring the downlinks for cell re-selection measurement signals, thereby saving energy in the UE.

Two circumstances are relevant to particular embodiments:
  A network deployment scenario that assumedly will become quite common when 5G systems are deployed is a network where neighbor nodes (e.g. gNBs) are (tightly or roughly) synchronized, including the starts of SS Burst Set transmissions.
  As implied by the potential SS Burst Set periodicity times identified above, even though the SS Burst Set periodicities may be different in different cells (possibly depending on the deployment scenario), they are always either equal or multiples of each other.

These circumstances imply that all signals which are relevant for a camping UE's cell re-selection measurements are confined to a limited interval which is repeated with periods in between when no such signals are transmitted in any of the neighbor cell (or the serving cell).

Particular embodiments leverage this by letting a gNB configure UEs in RRC_IDLE or RRC_INACTIVE state with repetitive measurement windows, which cover the time intervals when cell re-selection measurement signals are transmitted, but exclude the time periods when there are no SS Block transmissions in the vicinity (i.e. in the neighbor cells and the serving cell) to measure on, i.e. the time periods when it is pointless for a UE in RRC_IDLE or RRC_INACTIVE state to monitor the downlinks of the current and neighboring cells to measure on the relevant signals (e.g. the SSS and possibly DMRS on the PBCH, both being part of the SS Block) for the purpose of cell re-selection assessment.

Certain embodiments of the present disclosure may provide one or more technical advantages. For example, particular embodiments enable a UE in RRC_INACTIVE or RRC_IDLE state to save energy by minimizing the time it spends monitoring the downlink and performing measurement on downlink signals in the current and neighboring cells for the purpose of assessing the respective cell's suitability for camping and to determine whether cell re-selection should be performed. Other advantages may be readily apparent to one having skill in the art. Certain embodiments may have none, some, or all of the recited advantages.

Figure 1:
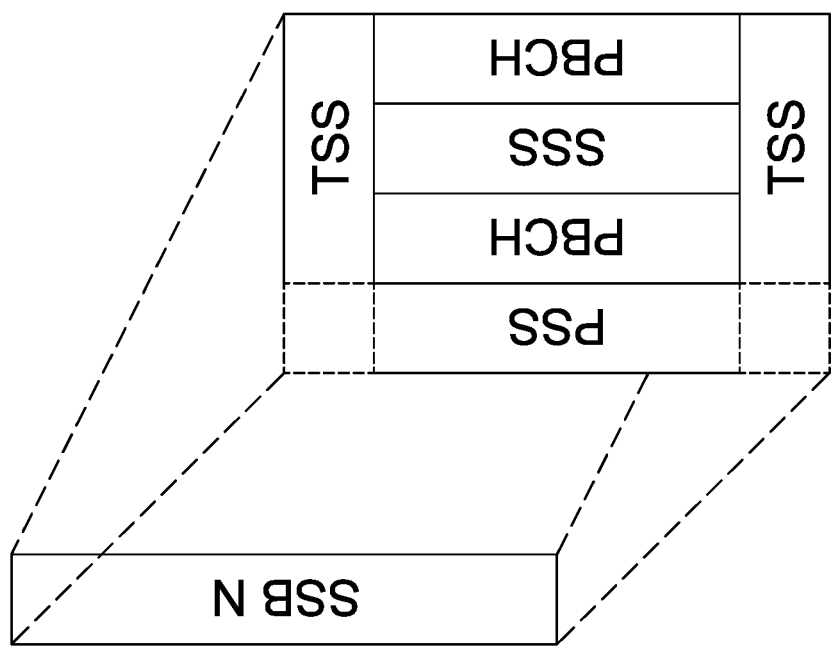
FIG. 1 is a schematic illustration of a format/structure of an SS Block in accordance with certain embodiments.
Figure 2:
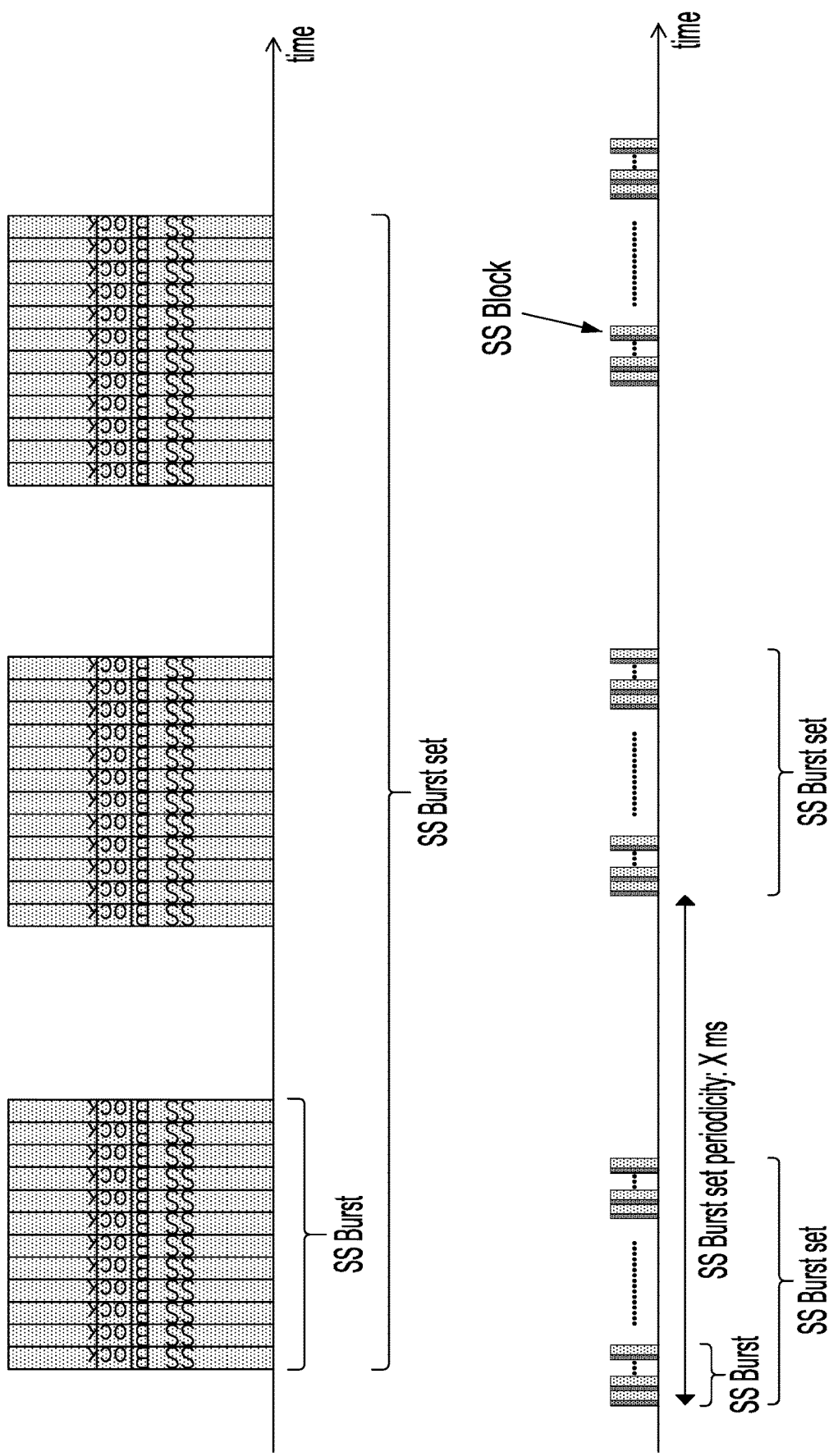
FIG. 2 is a schematic illustration of the concepts of SS Burst and SS Burst Set.
Figure 3:
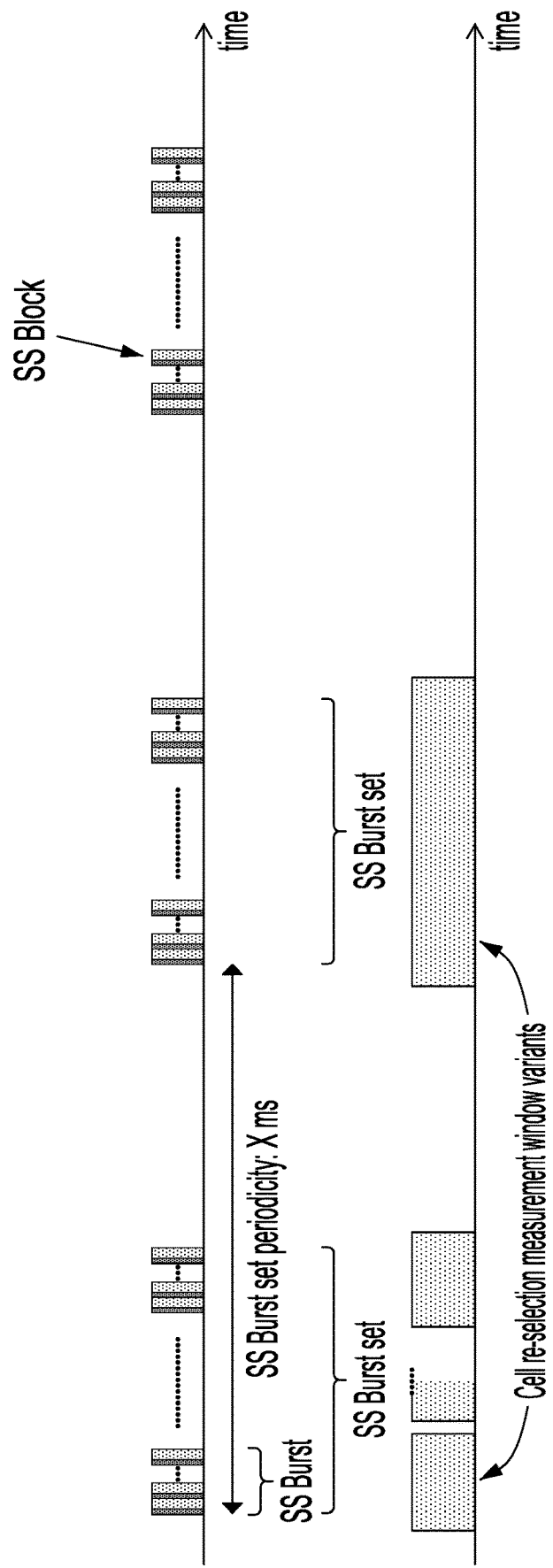
FIG. 3 is a schematic illustration of the principles of two variants of cell re-selection measurement windows.

FIG. 3 illustrates the principles of two variants of cell re-selection measurement windows, per SS Burst measurement window and per SS Burst Set measurement window, in accordance with particular embodiments.

Figure 4:
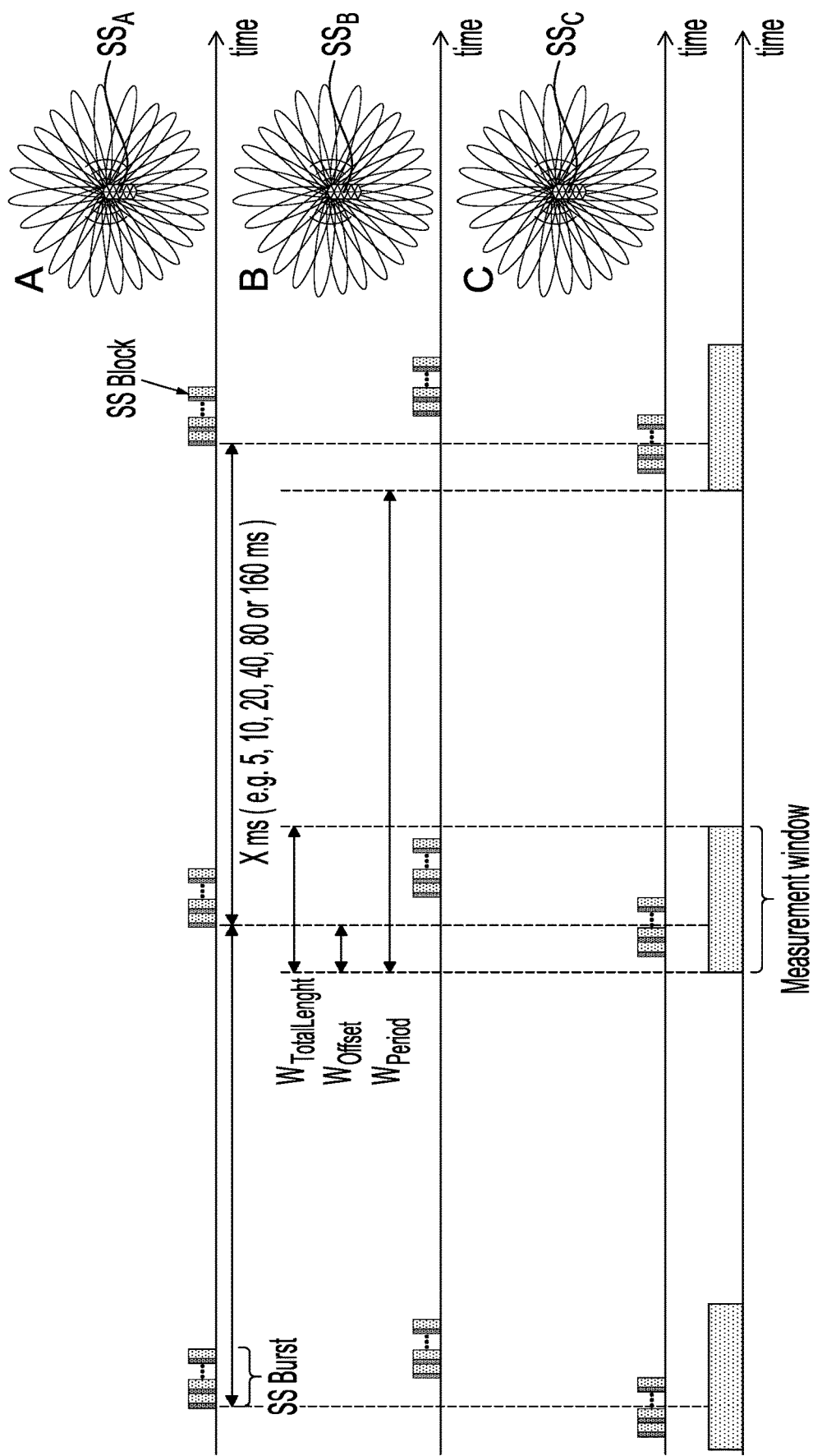
FIG. 4 is a schematic illustration of parameters that are relevant when configuring a repetitive cell re-selection measurement window.

To further illustrate the principles for how such a measurement window may be defined, relevant configuration parameters are depicted in FIG. 4, using a simple example with one SS Burst per SS Burst Set and a measurement window configured per SS Burst Set (which in practice is equivalent to a measurement window per SS Burst since an SS Burst Set in this example consists of a single SS Burst). FIG. 4 is a schematic illustration of parameters that are relevant when configuring a repetitive cell re-selection measurement window in an example scenario where an SS Burst Set consists of a single SS Burst. In the example, cell A is the concerned UE's current camping cell and cells B and C are neighbor cells of cell A.

A gNB must therefore be aware of the beam sweep configurations (in terms of number of beams in an SS Burst, the number of SS Bursts in an SS Burst Set, the inter-SS Burst interval and the SS Burst Set recurrence period) of neighbor cells/gNBs and (at least roughly) aware of inter-gNB synchronization accuracy. The inter-gNB synchronization (and high accuracy) is needed in order to perform the SMTC window configuration calculation. SS-block based measurement is used for inter-frequency and intra-frequency measurement. The gNB obtains this awareness from configuration and/or exchange of timing and/or SS Burst/SS Burst Set configuration or beam sweep configuration information between neighbor gNBs.

Based on this information, the gNB configures UEs in RRC_IDLE or RRC_INACTIVE state which are camping on a cell served by the gNB with a repetitive measurement window, which takes the inter-gNB synchronization inaccuracy, number of beams in an SS Burst, number of SS Bursts in an SS Burst Set, inter-SS Burst interval and SS Burst Set recurrence period of neighbor cells/gNBs into account. The gNB conveys the measurement window configuration to camping UEs by including measurement window configuration parameters in the system information of the cell(s) it serves. As an option, a gNB may also use dedicated signaling, e.g. RRC signaling, to convey the measurement window configuration to a UE, e.g. prior to or in conjunction with switching a UE from RRC_CONNECTED state to RRC_INACTIVE or RRC_IDLE state (e.g. using an RRCConnectionRelease message).

The overall measurement window configured by a gNB is adapted to the SS Burst Sets of the involved cells (i.e. the cell in which the measurement window configuration parameters are transmitted, i.e. the camping cell of UE(s) receiving the configuration parameters, and the cells neighboring this cell) and is repetitive with a repetition period equal to the smallest SS Burst Set recurrence period of the involved cells.

The overall measurement window may be chopped up in a number of sub-windows to enable per SS Burst window configuration (i.e. a sub-window is intended to cover an SS Burst transmission in the involved cells). A cell re-selection measurement window may thus have the following configurable parameters (note that these parameters should be seen as an advantageous example, but other configuration parameters essentially achieving the same purpose are also conceivable):

Overall window length: $W_{TotalLength}$ (matching the union of the SS Burst Sets of the involved cells);

Offset in relation to the start of an SS Burst Set of the current cell: $W_{Offset}$;

Overall window repetition period: $W_{Period}$ (matching the smallest SS Burst Set recurrence period among the involved cells);

Optional: Sub-window length: $W_{SubwindowLength}$ (adapted to the lengths and time offsets of the SS Bursts of the involved cells);

Optional: Sub-window repetition period $W_{SubwindowPeriod}$. The 3GPP may specify that the inter-SS Burst period within an SS Burst Set is fixed (i.e. always the same value in all cells). If so, then the $W_{SubwindowPeriod}$ parameter becomes redundant and may be omitted.

On FIG. 4 it is clearly shown that the window duration or length is smaller than or equal to the window period. The values 5, 10, 20, 40, 80, 160, also illustrated in FIG. 4, are known as SS Block Burst Set periodicity values.

The window period parameter is derived from the SS Block Burst Set periodicities from both serving cell and neighbor cells detected by the UE, so that the UE can measure on all cells in one period.

The per SS Burst sub-window configuration may be optional and a useful/meaningful sub-window configuration cannot always be achieved. For a useful/meaningful per SS Burst sub-window configuration to be feasible in some embodiments, the following conditions may be fulfilled:

There may be periods between SS Bursts which are "silent" (i.e. lack transmissions of cell re-selection measurement signals) simultaneously in all involved cells. This in turn requires that:

The inter-SS Burst recurrence interval within the SS Burst Set is the same in all involved cells.

The inter-gNB synchronization accuracy in relation to the lengths and recurrence interval of the SS Bursts is good enough to prevent SS Bursts in different cells from sliding so much in relation to each other that the common silent periods disappear.

In absence of the required information, or if the inter-gNB synchronization inaccuracy is too great (e.g. uncorrelated), then no measurement window is configured or a measurement window which has the same length as its repetition period is configured, i.e. essentially a continuous measurement window.

Figure 5:
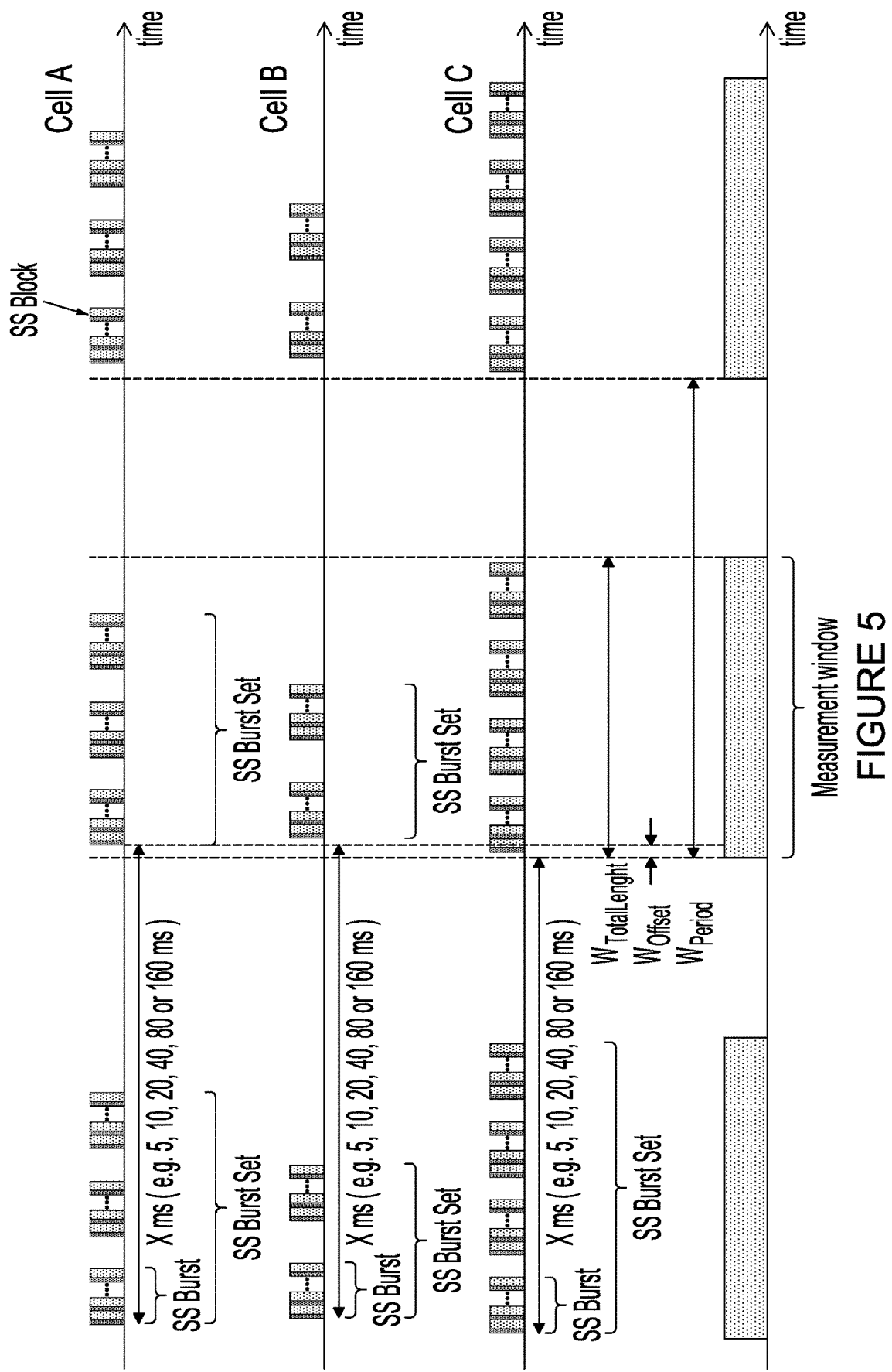
FIG. 5 illustrates an example where the inter-SS Burst periods differ between the involved cells.

FIG. 5 illustrates an example where the inter-SS Burst periods differ between the involved cells and the measurement window is configured only per SS Burst Set, whereas the optional sub-window configuration is omitted.

Figure 6:
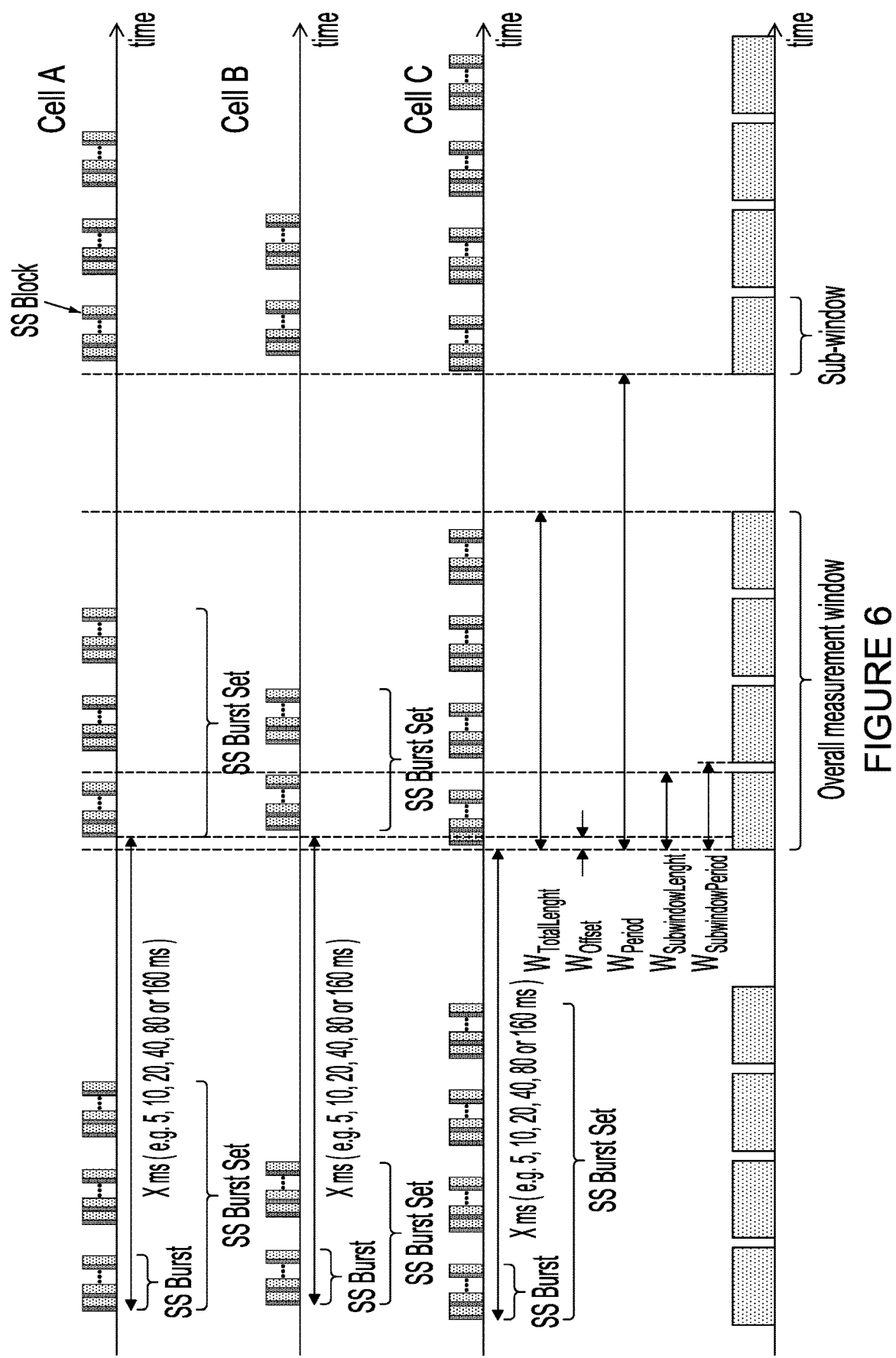
FIG. 6 illustrates an example where the inter-SS Burst periods are equal among the involved cells.

FIG. 6 illustrates an example where the inter-SS Burst periods are equal among the involved cells and the measurement window is configured as an overall measurement window per SS Burst Set with each overall measurement window divided into a number of sub-windows with per SS Burst granularity.

In particular embodiments, the network, e.g. the gNB, configures camping UEs in RRC_IDLE or RRC_INACTIVE state with repetitive cell re-selection measurement windows to avoid that camping UEs attempts to monitor and measure on cell re-selection measurement signals in neighbor cells (and the current cell) during time periods when no signals for cell-reselection measurements are available. Such repetitive measurement windows are configured to cover the time intervals when cell re-selection measurement signals are transmitted, but exclude the time periods when there are no cell re-selection measurement signal transmissions (e.g. SS Block transmissions) in the vicinity (i.e. in the neighbor cells and the serving cell) to measure on, i.e. the time periods when it is pointless for a UE in RRC_IDLE or RRC_INACTIVE state to monitor the downlinks of the current and neighboring cells to measure on the relevant signals (e.g. the SSS and possibly DMRS on the PBCH, both being part of the SS Block) for the purpose of cell re-selection assessment.

A camping UE receives the cell re-selection measurement window configuration via the system information or possibly via dedicated signaling prior to, or in conjunction with, switching from RRC_CONNECTED state to RRC_INACTIVE or RRC_IDLE state. While remaining camping on the same cell, the UE utilizes the received cell re-selection measurement window configuration to optimize its downlink monitoring and measurements on cell re-selection measurement signals in the current cell and neighbor cells, in order to minimize the time the UE has to spend to perform these activities.

Figure 7:
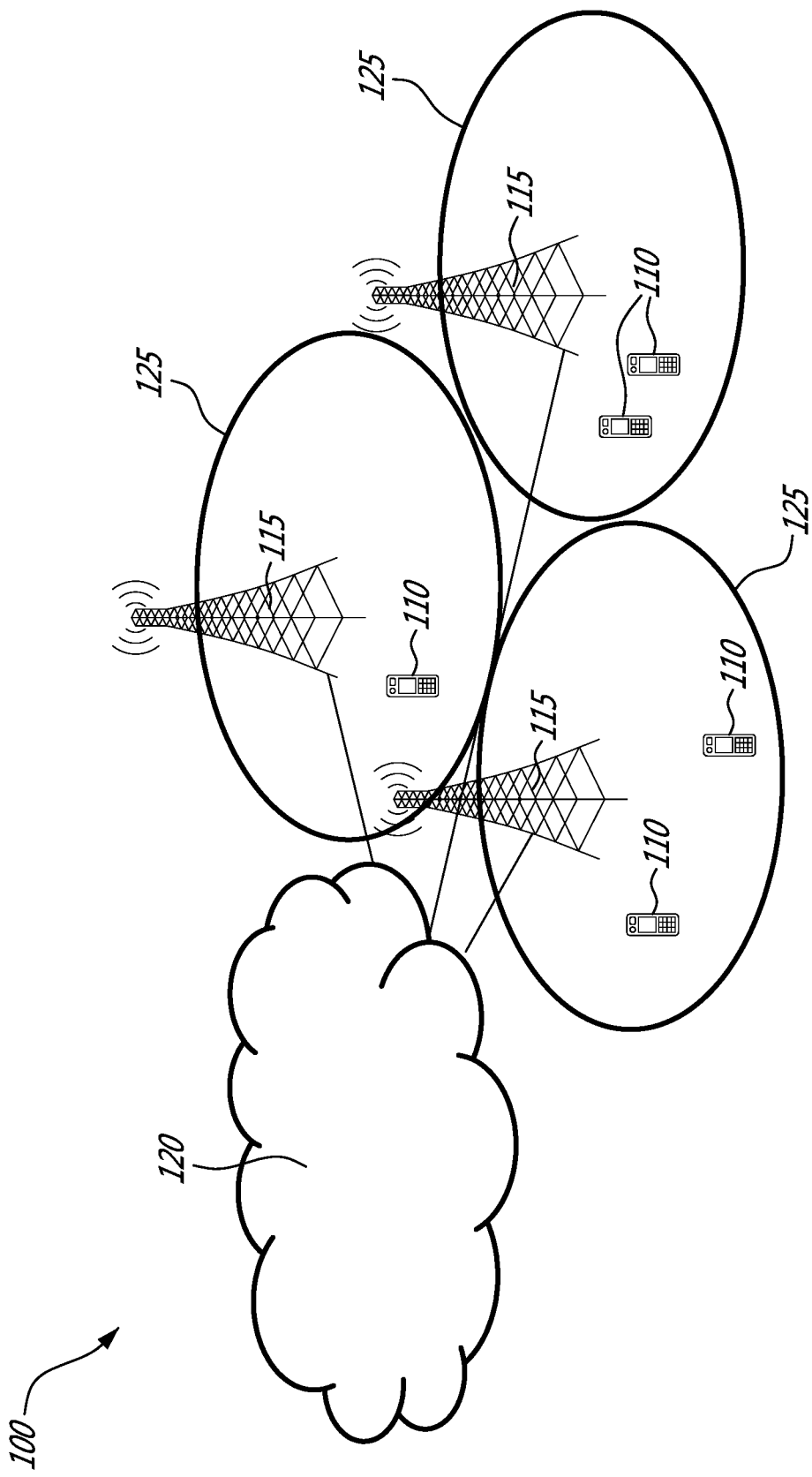
FIG. 7 is schematic block diagram illustrating an embodiment of a network, in accordance with certain embodiments.

FIG. 7 is a schematic block diagram illustrating an embodiment of a network 100, in accordance with certain embodiments. Network 100 includes one or more UE(s) 110 (which may be interchangeably referred to herein as wireless devices 110 or mobiles 110) and one or more network node(s) 115 (which may be interchangeably referred to as access nodes, eNBs, gNBs, or TRPs). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, system information, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") or access node is used. It can be any kind of network node, which may comprise a base station (BS), radio base station, Node B, multi-standard radio (MSR) radio node such as MSR BS, evolved Node B (eNB), gNodeB (gNB), TRP, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general, "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 8-12. Such UE and network nodes may implement the cell re-selection measurement windows described above with respect to FIGS. 1-6 and below with respect to FIG. 13.

Although FIG. 7 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a NR network, the embodiments may be implemented in any appropriate type of telecommunication system supporting any suitable communication standards (including 5G standards) and using any suitable components and are applicable to any radio access technology (RAT) or multi-RAT systems in which a UE receives and/or transmits signals (e.g., data). For example, the various embodiments described herein may be applicable to LTE, LTE-Advanced, NR, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the DL, the present disclosure contemplates that the various embodiments are equally applicable in the UL.

Figure 8:
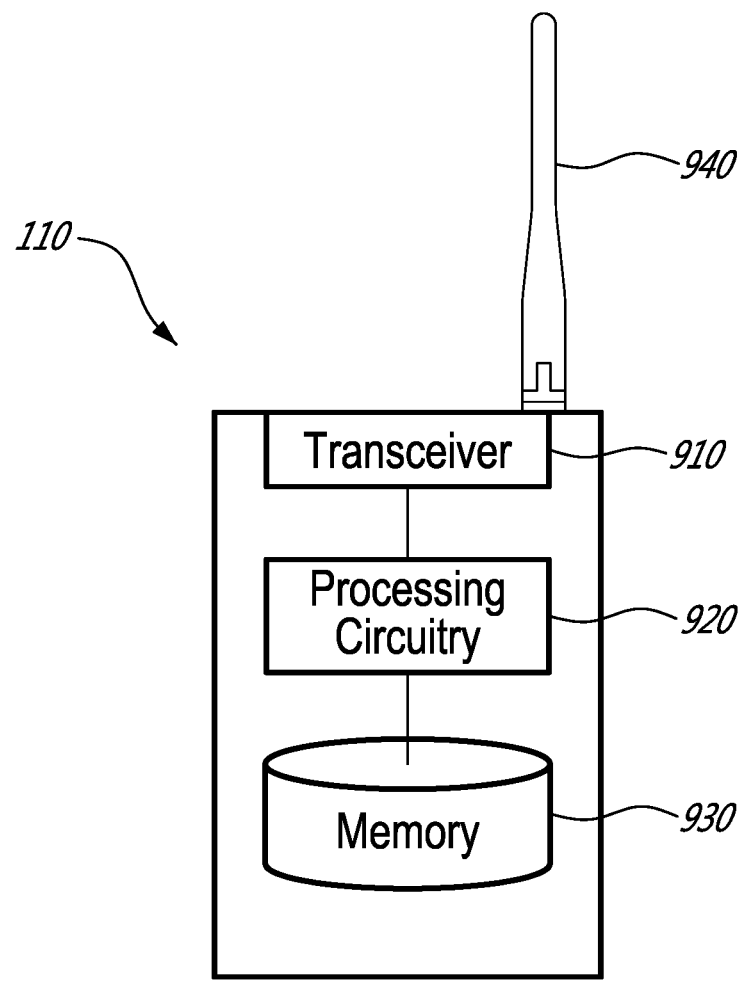
FIG. 8 is a schematic block diagram of an exemplary wireless device, in accordance with certain embodiments.

FIG. 8 is a schematic block diagram of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 910, processing circuitry 920, and memory 930. In some embodiments, transceiver 910 facilitates transmitting wireless signals to and receiving wireless signals from network node 115 (e.g., via antenna 940), processing circuitry 920 executes instructions to provide some or all of the functionality described above as being provided by wireless device 110, and memory 930 stores the instructions executed by processing circuitry 920.

Processing circuitry 920 may include any suitable combination of hardware and software implemented in one or more modules to execute instructions and manipulate data to perform some or all of the described functions of wireless device 110, such as the functions of wireless device 110 described above in relation to FIGS. 1-7 and below in relation to FIG. 13. In some embodiments, processing circuitry 920 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 930 is generally operable to store instructions, such as a computer program, software, an application including one or more of logic, rules, algorithms, code, tables, etc. and/or other instructions capable of being executed by processing circuitry 920. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 920.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc. Wireless device 110 may further include a power source.

The User Equipment (UE) 110 is operative to camp on a cell served by a radio network node 115 and to be configured for Synchronization Signal (SS) Blocks based cell re-selection measurements for RRC_IDLE and RRC_INACTIVE states. The UE 110 comprises processing circuitry 920 and a memory 930. The memory 930 contains instructions executable by the processing circuitry 920 whereby the UE 110 is operative to receive information from the radio network node 115, including configuration parameters for a measurement window, the configuration parameters comprising a window periodicity parameter, a window offset parameter and a window duration parameter, for configuring the UE for the SS Blocks based cell re-selection measurements for RRC_IDLE and RRC_INACTIVE states.

The radio network node may be a gNodeB (gNB). The information may be received by the UE in system information (SI). The window periodicity parameter may have a value equal to a smallest SS Burst Set recurrence period among the cell served by the radio network node and involved neighboring cells. The window periodicity parameter may have a value selected within the group consisting of 5, 10, 20, 40, 80 and 160 milliseconds. The window offset parameter may be smaller than the window periodicity parameter. The window duration parameter may be smaller than or equal to the configured window periodicity parameter. There may be repetitive measurement windows covering time intervals when the SS Blocks are transmitted in a vicinity of the UE. The measurement window may cover an SS Burst. The measurement window may cover an SS Burst Set, the window offset may be in relation to the start of the SS Burst Set of a current serving cell and the window duration may be the union of SS Burst Sets of the current serving cell and involved neighboring cells. An SS Burst Set may comprise one SS Burst, and the measurement window may cover the SS Burst. The UE may further be operative to be configured by configuring the measurement window based on an inter-radio network node synchronization accuracy, a number of beams in an SS Burst, a number of SS Bursts in an SS Burst Set, an inter-SS Burst interval, and a SS Burst Set recurrence period of neighbor radio network nodes; the inter-radio network node synchronization accuracy, the number of beams in an SS Burst, the number of SS Bursts in an SS Burst Set, the inter-SS Burst interval, and the SS Burst Set recurrence period of the neighbor radio network node s being provided by the radio network node. The UE may further be operative to receive the information through Radio Resource Control (RRC) signaling from the radio network node prior to or in conjunction with instruction for switching from RRC_CONNECTED state to RRC_INACTIVE or RRC_IDLE state. The UE may further be operative to receive the information through a RRCConnectionRelease message from the radio network node. The measurement window may be divided in a plurality of sub-windows to enable per SS Burst window configuration. The information may comprise further configuration parameters for the measurement window including a sub-window duration parameter and a sub-window repetition periodicity parameter.

Figure 9:
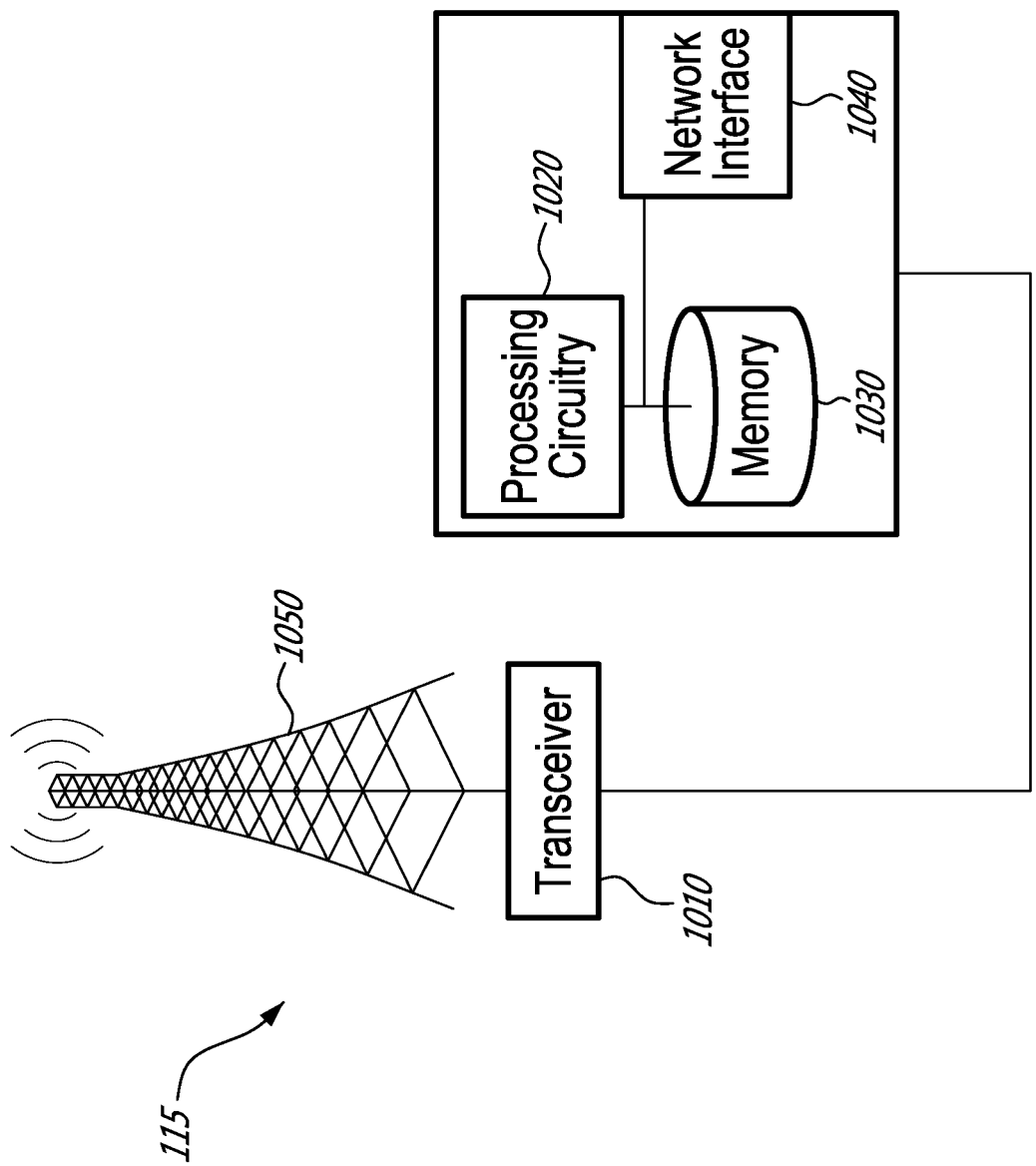
FIG. 9 is a schematic block diagram of an exemplary network node, in accordance with certain embodiments.

FIG. 9 is a schematic block diagram of an exemplary network node 115, in accordance with certain embodiments. Network node 115 may be any type of radio network node or any network node that communicates with a UE and/or with another network node. Examples of network node 115 include an access node, eNodeB, a gNB, a node B, TRP, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processing circuitry 1020, memory 1030, and network interface 1040. In some embodiments, transceiver 1010 facilitates transmitting wireless signals to and receiving wireless signals from wireless device 110 (e.g., via antenna 1050), processing circuitry 1020 executes instructions to provide some or all of the functionality described above as being provided by a network node 115, memory 1030 stores the instructions executed by processing circuitry 1020, and network interface 1040 communicates signals to backend network components, such as a gateway, switch, router, Internet, Public Switched Telephone Network (PSTN), core network nodes or radio network controllers 130, etc.

Processing circuitry 1020 may include any suitable combination of hardware and software implemented in one or more modules to execute instructions and manipulate data to perform some or all of the described functions of network node 115, such as those described above in relation to FIGS. 1-7 and below in relation to FIG. 13. In some embodiments, processing circuitry 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by processing circuitry 1020. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processing circuitry 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 9 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Network node 115 may be a radio network node operative to configure a User Equipment (UE) 110 camping on a cell served by the radio network node for Synchronization Signal (SS) Blocks based cell re-selection measurements for RRC_IDLE and RRC_INACTIVE states. The radio network node comprises processing circuitry 1020 and a memory 1030. The memory 1030 contains instructions executable by the processing circuitry 1020 whereby the radio network node 115 is operative to provide information to the UE 110, including configuration parameters for a measurement window, the configuration parameters comprising a window periodicity parameter, a window offset parameter and a window duration parameter, for configuring the UE for the SS Blocks based cell re-selection measurements for RRC_IDLE and RRC_INACTIVE states.

The radio network node may be a gNodeB (gNB). The information provided may be system information (SI). The window periodicity parameter may have a value equal to a smallest SS Burst Set recurrence period among the cell served by the radio network node and involved neighboring cells. The window periodicity parameter may have a value selected within the group consisting of 5, 10, 20, 40, 80 and 160 milliseconds. The window offset parameter may be smaller than the window periodicity parameter. The window duration parameter may be smaller than or equal to the configured window periodicity parameter. The radio network node may further be operative to serve at least one cell and the information may be provided to the at least one cell served by the radio network node. There may be repetitive measurement windows covering time intervals when the SS Blocks are transmitted in a vicinity of the UE. The measurement window may cover an SS Burst. The measurement window may cover an SS Burst Set, the window offset may be in relation to the start of the SS Burst Set of a current serving cell and the window duration may be the union of SS Burst Sets of the current serving cell and involved neighboring cells. An SS Burst Set may comprise one SS Burst, and the measurement window may cover the SS Burst. The radio network node may further be operative to obtain beam sweep configurations of inter-radio network node synchronization accuracy from neighbor radio network node s. The beam sweep configurations may comprise a number of beams in an SS Burst, a number of SS Bursts in an SS Burst Set, an inter-SS Burst interval, and at least an approximation of an SS Burst Set recurrence period of the neighbor radio network node s. The radio network node may further be operative to use Radio Resource Control (RRC) signaling to convey the information to the UE prior to or in conjunction with switching the UE from RRC_CONNECTED state to RRC_INACTIVE or RRC_IDLE state. The radio network node may further be operative to use a RRCConnectionRelease message to convey the information to the UE. The measurement window may be divided in a plurality of sub-windows to enable per SS Burst window configuration. The SI may comprise further configuration parameters for the measurement window including a sub-window duration parameter and a sub-window repetition periodicity parameter.

Figure 10:
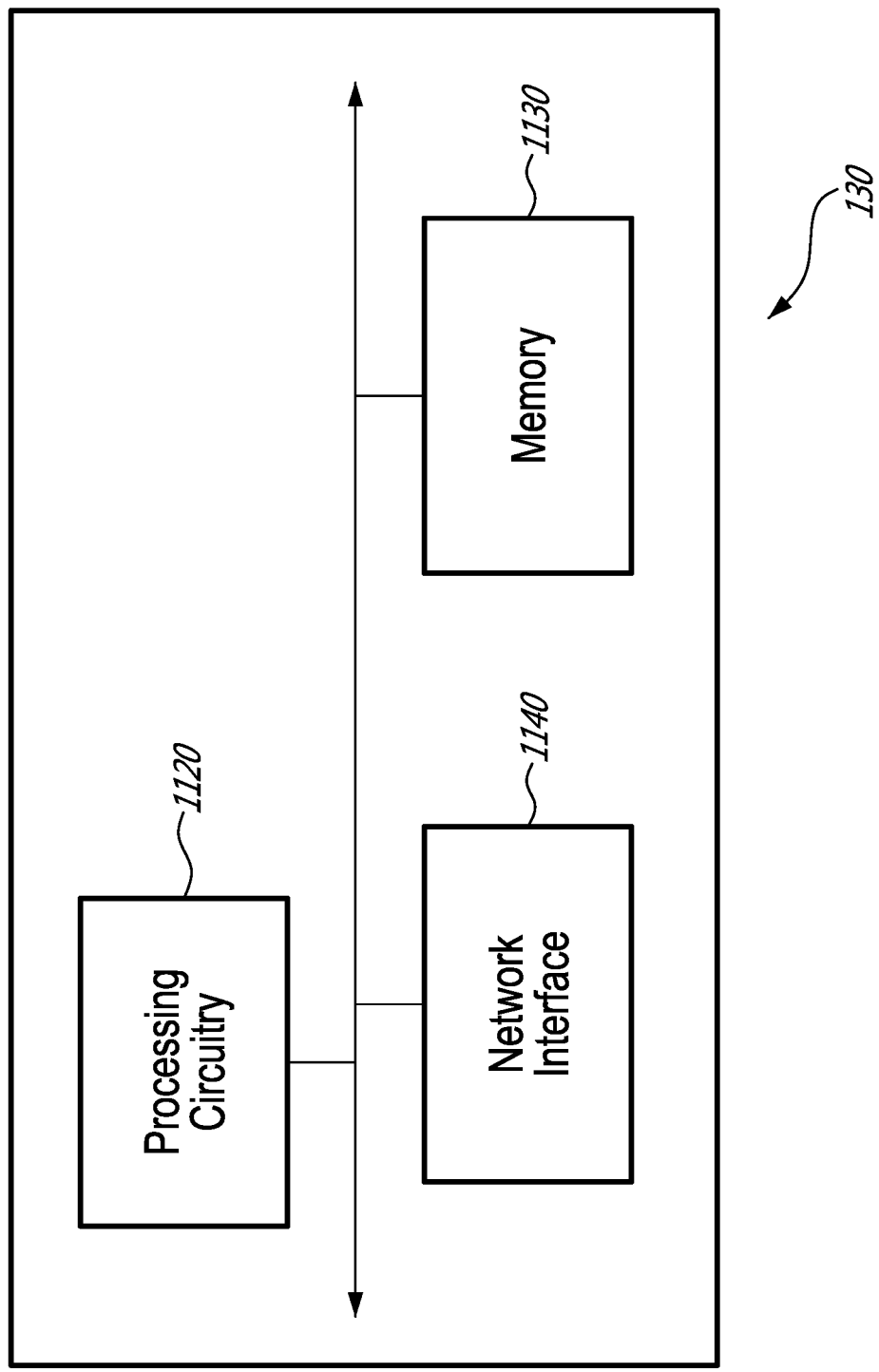
FIG. 10 is a schematic block diagram of an exemplary radio network controller or core network node, in accordance with certain embodiments.

FIG. 10 is a schematic block diagram of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1120, memory 1130, and network interface 1140. In some embodiments, processing circuitry 1120 executes instructions to provide some or all of the functionality described above as being provided by the network node, memory 1130 stores the instructions executed by processing circuitry 1120, and network interface 1140 communicates signals to any suitable node, such as a gateway, switch, router, Internet, Public Switched Telephone Network (PSTN), network nodes 115, radio network controllers or core network nodes 130, etc.

Processing circuitry 1120 may include any suitable combination of hardware and software implemented in one or more modules to execute instructions and manipulate data to perform some or all of the described functions of the radio network controller or core network node 130. In some embodiments, processing circuitry 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by processing circuitry 1120. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processing circuitry 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Figure 11:
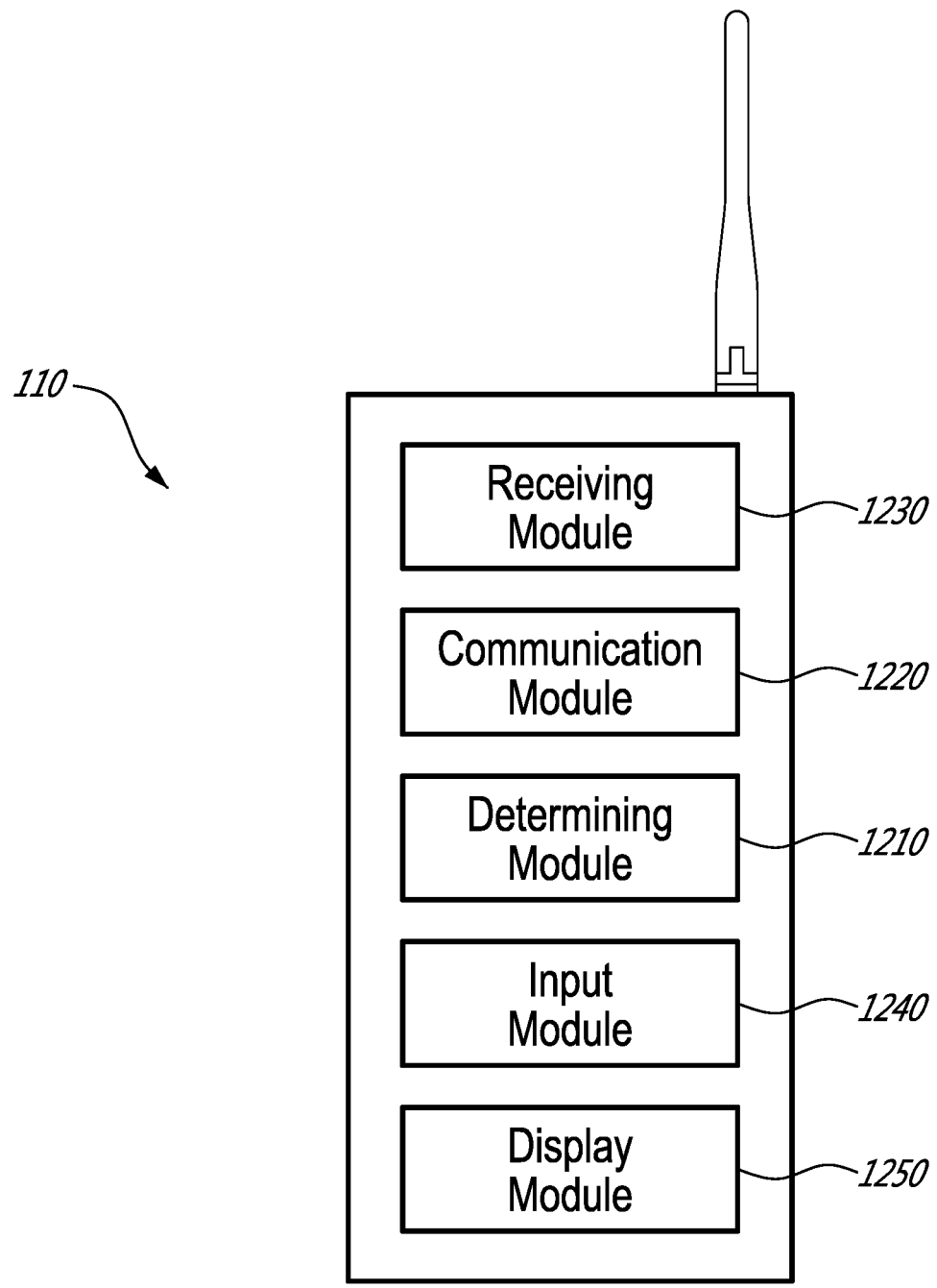
FIG. 11 is a schematic block diagram of an exemplary wireless device, in accordance with certain embodiments.

FIG. 11 is a schematic block diagram of an exemplary wireless device, in accordance with certain embodiments. Wireless device 110 may include one or more modules. For example, wireless device 110 may include a determining module 1210, a communication module 1220, a receiving module 1230, an input module 1240, a display module 1250, and any other suitable modules. In some embodiments, one or more of determining module 1210, communication module 1220, receiving module 1230, input module 1240, display module 1250, or any other suitable module may be implemented using one or more processors, such as processing circuitry 920 described above in relation to FIG. 8. In certain embodiments, the functions of two or more of the various modules may be combined into a single module. Wireless device 110 may perform the functionality related to cell re-selection measurement windows described above in relation to FIGS. 1-7 and below in relation to FIG. 13.

Determining module 1210 may perform the processing functions of wireless device 110.

Determining module 1210 may include or be included in one or more processors, such as processing circuitry 920 described above in relation to FIG. 8. Determining module 1210 may include analog and/or digital circuitry configured to perform any of the functions of determining module 1210 and/or processing circuitry 920 described above. The functions of determining module 1210 described above may, in certain embodiments, be performed in one or more distinct modules.

Communication module 1220 may perform the transmission functions of wireless device 110. Communication module 1220 may include a transmitter and/or a transceiver, such as transceiver 910 described above in relation to FIG. 8. Communication module 1220 may include circuitry configured to wirelessly transmit messages and/or signals. In particular embodiments, communication module 1220 may receive messages and/or signals for transmission from determining module 1210. In certain embodiments, the functions of communication module 1220 described above may be performed in one or more distinct modules.

Receiving module 1230 may perform the receiving functions of wireless device 110. Receiving module 1230 may include a receiver and/or a transceiver. Receiving module 1230 may include a receiver and/or a transceiver, such as transceiver 910 described above in relation to FIG. 8. Receiving module 1230 may include circuitry configured to wirelessly receive messages and/or signals. In particular embodiments, receiving module 1230 may communicate received messages and/or signals to determining module 1210. The functions of receiving module 1230 described above may, in certain embodiments, be performed in one or more distinct modules.

Input module 1240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1210. The functions of input module 1240 described above may, in certain embodiments, be performed in one or more distinct modules.

Display module 1250 may present signals on a display of wireless device 110. Display module 1250 may include the display and/or any appropriate circuitry and hardware configured to present signals on the display. Display module 1250 may receive signals to present on the display from determining module 1210. The functions of display module 1250 described above may, in certain embodiments, be performed in one or more distinct modules.

Determining module 1210, communication module 1220, receiving module 1230, input module 1240, and display module 1250 may include any suitable configuration of hardware and/or software. Wireless device 110 may include additional modules beyond those shown in FIG. 11 that may be responsible for providing any suitable functionality, including any of the functionality described above and/or any additional functionality (including any functionality necessary to support the various solutions described herein).

Figure 12:
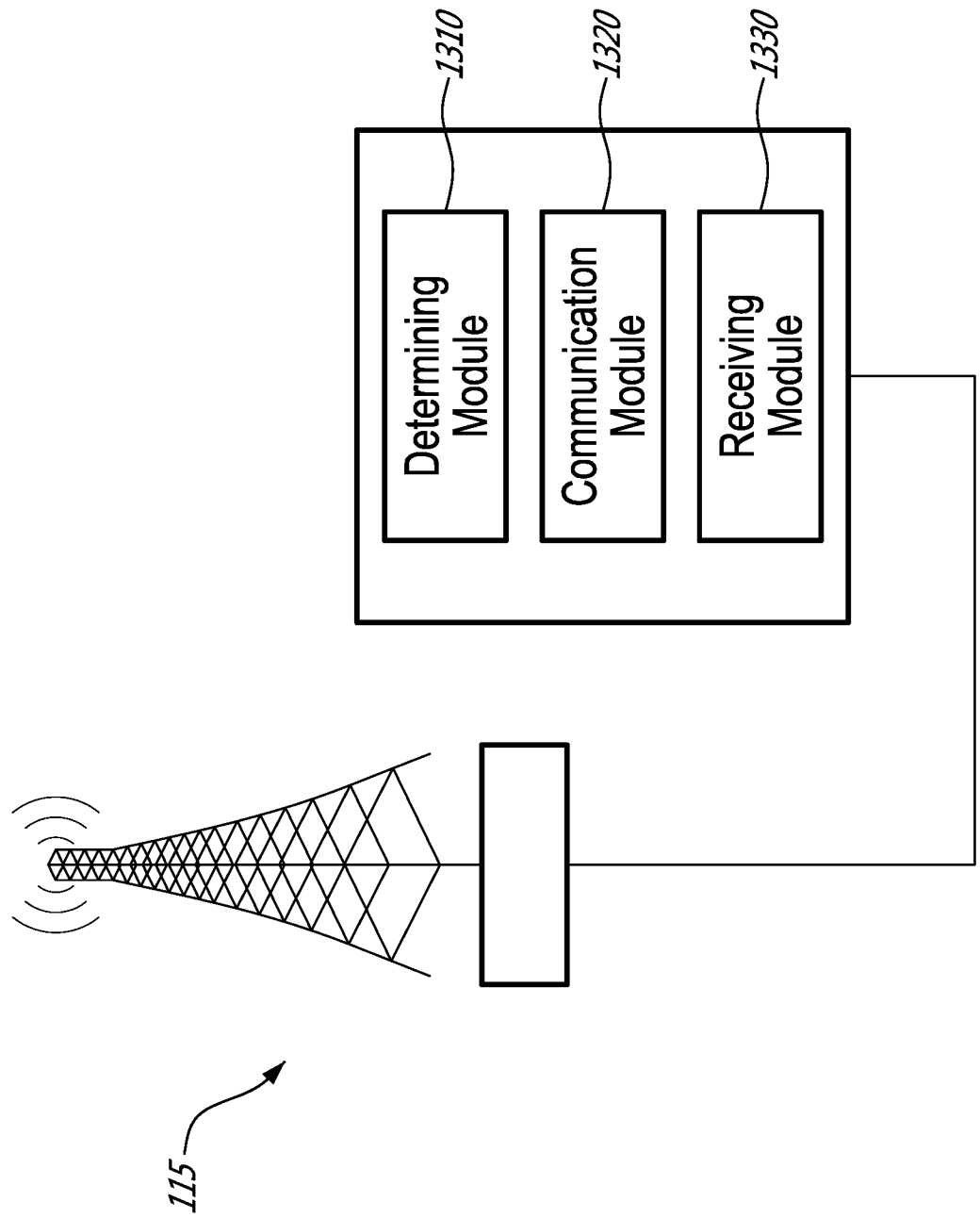
FIG. 12 is a schematic block diagram of an exemplary network node, in accordance with certain embodiments.

FIG. 12 is a schematic block diagram of an exemplary network node 115, in accordance with certain embodiments. Network node 115 may include one or more modules. For example, network node 115 may include determining module 1310, communication module 1320, receiving module 1330, and any other suitable modules. In some embodiments, one or more of determining module 1310, communication module 1320, receiving module 1330, or any other suitable module may be implemented using one or more processors, such as processing circuitry 1020 described above in relation to FIG. 9. In certain embodiments, the functions of two or more of the various modules may be combined into a single module. Network node 115 may perform the methods related to channel raster and numbering described above with respect to FIGS. 1-7 and below in relation to FIG. 13.

Determining module 1310 may perform the processing functions of network node 115. As an example, determining module 1310 may perform the cell re-selection measurement window functionality described above for access nodes. Determining module 1310 may include or be included in one or more processors, such as processing circuitry 1020 described above in relation to FIG. 9. Determining module 1310 may include analog and/or digital circuitry configured to perform any of the functions of determining module 1310 and/or processing circuitry 1020 described above. The functions of determining module 1310 may, in certain embodiments, be performed in one or more distinct modules.

Communication module 1320 may perform the transmission functions of network node 115. Communication module 1320 may transmit messages to one or more of wireless devices 110. Communication module 1320 may include a transmitter and/or a transceiver, such as transceiver 1010 described above in relation to FIG. 9. Communication module 1320 may include circuitry configured to wirelessly transmit messages and/or signals. In particular embodiments, communication module 1320 may receive messages and/or signals for transmission from determining module 1310 or any other module. The functions of communication module 1320 may, in certain embodiments, be performed in one or more distinct modules.

Receiving module 1330 may perform the receiving functions of network node 115. Receiving module 1330 may receive any suitable information from a wireless device. Receiving module 1330 may include a receiver and/or a transceiver, such as transceiver 1010 described above in relation to FIG. 9. Receiving module 1330 may include circuitry configured to wirelessly receive messages and/or signals. In particular embodiments, receiving module 1330 may communicate received messages and/or signals to determining module 1310 or any other suitable module. The functions of receiving module 1330 may, in certain embodiments, be performed in one or more distinct modules.

Determining module 1310, communication module 1320, and receiving module 1330 may include any suitable configuration of hardware and/or software. Network node 115 may include additional modules beyond those shown in FIG. 12 that may be responsible for providing any suitable functionality, including any of the functionality described above and/or any additional functionality (including any functionality necessary to support the various solutions described herein).

Figure 13:
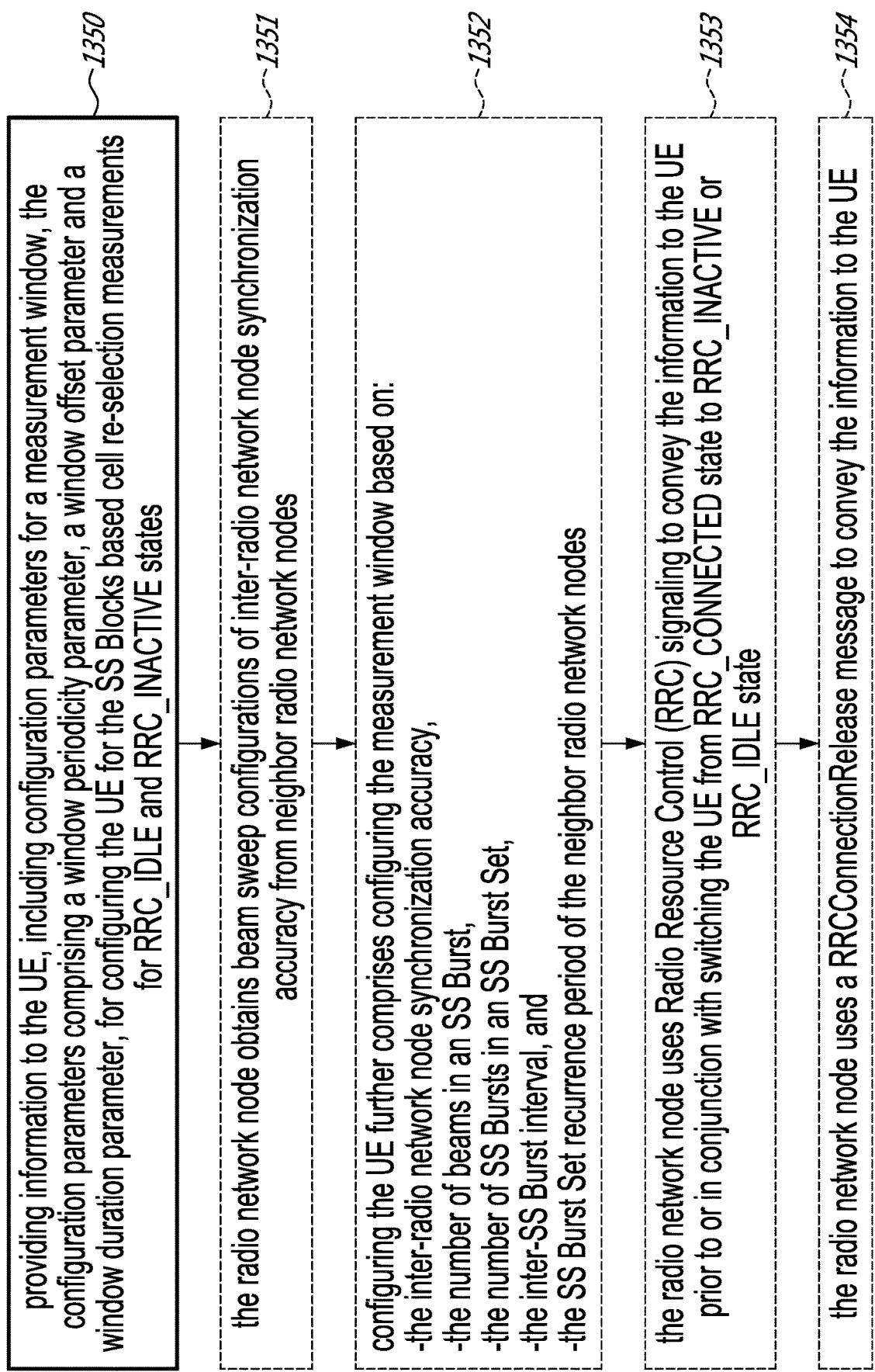
FIG. 13 is a flowchart of a method, in accordance with certain embodiments.

FIG. 13 illustrates a method, executed by a radio network node, for configuring a User Equipment (UE) camping on a cell served by the radio network node for Synchronization Signal (SS) Blocks based cell re-selection measurements for RRC_IDLE and RRC_INACTIVE states. The method comprises providing, step 1350, information to the UE, including configuration parameters for a measurement window, the configuration parameters comprising a window periodicity parameter, a window offset parameter and a window duration parameter, for the SS Blocks based cell re-selection measurements for RRC_IDLE and RRC_INACTIVE states.

The radio network node may be a gNodeB (gNB). The information may be provided to the UE in system information (SI). The window periodicity parameter may have a value equal to a smallest SS Burst Set recurrence period among the cell served by the radio network node and the involved neighboring cells. The window periodicity parameter may have a value selected within the group consisting of 5, 10, 20, 40, 80 and 160 milliseconds. The window offset parameter may be smaller than the window periodicity parameter. The window duration parameter may be smaller than or equal to the configured window periodicity parameter. The radio network node may serve at least one cell and wherein the information is provided to the at least one cell served by the radio network node. There may be repetitive measurement windows covering time intervals when the SS Blocks are transmitted in a vicinity of the UE. The measurement window may cover an SS Burst. The measurement window may cover an SS Burst Set, the window offset may be in relation to the start of the SS Burst Set of a current serving cell and the window duration may be the union of SS Burst Sets of the current serving cell and the involved neighboring cells. An SS Burst Set may comprise one SS Burst, and the measurement window may cover the SS Burst. The radio network node may obtain, step 1351, beam sweep configurations of inter-radio network node synchronization accuracy from neighbor radio network node s. The beam sweep configurations may comprise a number of beams in an SS Burst, a number of SS Bursts in an SS Burst Set, an inter-SS Burst interval, and at least an approximation of an SS Burst Set recurrence period of the neighbor radio network node s. Configuring the UE may further comprise configuring, step 1352, the measurement window based on the inter-radio network node synchronization accuracy, the number of beams in an SS Burst, the number of SS Bursts in an SS Burst Set, the inter-SS Burst interval, and the SS Burst Set recurrence period of the neighbor radio network node s. The radio network node may use, step 1353, Radio Resource Control (RRC) signaling to convey the information to the UE prior to or in conjunction with switching the UE from RRC_CONNECTED state to RRC_INACTIVE or RRC_IDLE state. The radio network node may use, step 1354, a RRCConnectionRelease message to convey the information to the UE. The measurement window may be divided in a plurality of sub-windows to enable per SS Burst window configuration. The information may comprise further configuration parameters for the measurement window including a sub-window duration parameter and a sub-window repetition periodicity parameter.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order and optional steps may be illustrated using dashed lines.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A User Equipment (UE) operative to camp on a cell in a radio network and to be configured for Synchronization Signal (SS) Blocks based cell re-selection measurements for RRC_IDLE and RRC_INACTIVE states, the UE comprising a processing circuitry configured to:
   receive information from the radio network, including configuration parameters for a measurement window, the configuration parameters defining a window periodicity, offset and duration, for configuring the UE for the SS Blocks based cell re-selection measurements for RRC_IDLE and RRC_INACTIVE states,
wherein the processing circuitry of the UE is further configured to receive the information through Radio Resource Control (RRC) signaling from the radio network prior to or in conjunction with instruction for switching from RRC_CONNECTED state to RRC_INACTIVE or RRC_IDLE state, to receive the information through a RRCConnectionRelease message from the radio network and to receive the information in system information (SI).

2. The UE of claim 1, wherein the radio network node is a gNodeB (gNB).

3. The UE of claim 1, wherein the window periodicity has a value equal to a smallest SS Burst Set recurrence period among the cell served by the radio network node and involved neighboring cells, the window offset is smaller than the window periodicity and the window duration is smaller than or equal to the configured window periodicity.

4. The UE of claim 1, wherein the window periodicity has a value selected within the group consisting of 5, 10, 20, 40, 80 and 160 milliseconds.

5. The UE of claim 1, wherein there are repetitive measurement windows covering time intervals when the SS Blocks are transmitted in a vicinity of the UE and the measurement window covers an SS Burst.

6. The UE of claim 1, wherein the measurement window covers an SS Burst Set, the window offset is in relation to the start of the SS Burst Set of a current serving cell and the window duration is the union of SS Burst Sets of the current serving cell and involved neighboring cells.

7. The UE of claim 1, wherein the UE is configured by configuring the measurement window based on an inter-radio network node synchronization accuracy, a number of beams in an SS Burst, a number of SS Bursts in an SS Burst Set, an inter-SS Burst interval, and a SS Burst Set recurrence period of neighbor radio network nodes; the inter-radio network node synchronization accuracy, the number of beams in an SS Burst, the number of SS Bursts in an SS Burst Set, the inter-SS Burst interval, and the SS Burst Set recurrence period of the neighbor radio network nodes being provided by the radio network node.

8. The UE of any one of claim 1, wherein the measurement window is divided in a plurality of sub-windows and the information comprises further configuration parameters for the measurement window including a sub-window duration parameter and a sub-window repetition periodicity parameter.

9. A method, executed by a User Equipment (UE) for camping on a cell in a radio network, for configuring the UE for Synchronization Signal (SS) Blocks based cell re-selection measurements for RRC_IDLE and RRC_INACTIVE states, comprising:
receiving information from the radio network, including configuration parameters for a measurement window, the configuration parameters defining a window periodicity, offset and duration, for configuring the UE for the SS Blocks based cell re-selection measurements for RRC_IDLE and RRC_INACTIVE states,
wherein the UE receives the information through Radio Resource Control (RRC) signaling from the radio network prior to or in conjunction with instruction for switching from RRC_CONNECTED state to RRC_INACTIVE or RRC_IDLE state, the UE receives the information through a RRCConnectionRelease message from the radio network and the UE also receives the information in system information (SI).

10. The method of claim 9, wherein the radio network node is a gNodeB (gNB).

11. The method of claim 9, wherein the window periodicity has a value equal to a smallest SS Burst Set recurrence period among the cell served by the radio network node and involved neighboring cells, the window offset is smaller than the window periodicity and the window duration is smaller than or equal to the configured window periodicity.

12. The method of claim 9, wherein the window periodicity has a value selected within the group consisting of 5, 10, 20, 40, 80 and 160 milliseconds.

13. The method of claim 9, wherein there are repetitive measurement windows covering time intervals when the SS Blocks are transmitted in a vicinity of the UE and wherein the measurement window covers an SS Burst.

14. The method of claim 9, wherein the measurement window covers an SS Burst Set, the window offset is in relation to the start of the SS Burst Set of a current serving cell and the window duration is the union of SS Burst Sets of the current serving cell and involved neighboring cells.

15. The method of claim 9, further comprising configuring the measurement window based on an inter-radio network node synchronization accuracy, a number of beams in an SS Burst, a number of SS Bursts in an SS Burst Set, an inter-SS Burst interval, and a SS Burst Set recurrence period of neighbor radio network nodes; the inter-radio network node synchronization accuracy, the number of beams in an SS Burst, the number of SS Bursts in an SS Burst Set, the inter-SS Burst interval, and the SS Burst Set recurrence period of the neighbor radio network nodes being provided by the radio network node.

16. The method of claim 9, wherein the measurement window is divided in a plurality of sub-windows and the information comprises further configuration parameters for the measurement window including a sub-window duration parameter and a sub-window repetition periodicity parameter.

17. A method, executed by at least one node in a radio network, for configuring a User Equipment (UE) for camping on a cell in the radio network for Synchronization Signal (SS) Blocks based cell re-selection measurements for RRC_IDLE and RRC_INACTIVE states, the method comprising:
providing information to the UE, including configuration parameters for a measurement window, the configuration parameters defining a window periodicity, offset and duration, for configuring the UE for the SS Blocks based cell re-selection measurements for RRC_IDLE and RRC_INACTIVE states,
wherein the at least one node uses Radio Resource Control (RRC) signaling to convey the information to the UE prior to or in conjunction with switching the UE from RRC_CONNECTED state to RRC_INACTIVE or RRC_IDLE state, wherein the at least one node uses a RRCConnectionRelease message to convey the information to the UE and wherein the information is also provided in system information (SI).

18. The method of claim 17, wherein the at least one node is a radio network node and is a gNodeB (gNB).

19. The method of claim 17, wherein the cell is served by a radio network node, wherein the window periodicity has a value equal to a smallest SS Burst Set recurrence period among the cell served by the radio network node and involved neighboring cells, the window offset is smaller than the window periodicity and the window duration is smaller than or equal to the configured window periodicity.

20. The method of claim 17, wherein the window periodicity has a value selected within the group consisting of 5, 10, 20, 40, 80 and 160 milliseconds.

21. The method of claim 17, wherein there are repetitive measurement windows covering time intervals when the SS Blocks are transmitted in a vicinity of the UE and the measurement window covers an SS Burst.

22. The method of claim 17, wherein the measurement window covers an SS Burst Set, the window offset is in relation to the start of the SS Burst Set of a current serving cell and the window duration is the union of SS Burst Sets of the current serving cell and involved neighboring cells.

23. The method of claim 17, wherein the cell is served by a radio network node, wherein the radio network node obtains beam sweep configurations of inter-radio network node synchronization accuracy from neighbor radio network nodes.

24. The method of claim 23, wherein the beam sweep configurations comprise:
a number of beams in an SS Burst,
a number of SS Bursts in an SS Burst Set,
an inter-SS Burst interval, and
at least an approximation of an SS Burst Set recurrence period of the neighbor radio network nodes,
and wherein the configuration parameters for the measurement window are based on:
the inter-radio network node synchronization accuracy,
the number of beams in an SS Burst,
the number of SS Bursts in an SS Burst Set,
the inter-SS Burst interval, and
the SS Burst Set recurrence period of the neighbor radio network nodes.

25. The method of claim 17, wherein the measurement window is divided in a plurality of sub-windows and the information comprises further configuration parameters for the measurement window including a sub-window duration parameter and a sub-window repetition periodicity parameter.

26. A radio network comprising at least one node operative to configure a User Equipment (UE) for camping on a cell in the radio network for Synchronization Signal (SS) Blocks based cell re-selection measurements for RRC_IDLE and RRC_INACTIVE states, the at least one node comprising a processing circuitry configured to:

provide information to the UE, including configuration parameters for a measurement window, the configuration parameters defining a window periodicity, offset and duration, for configuring the UE for the SS Blocks based cell re-selection measurements for RRC_IDLE and RRC_INACTIVE states, wherein the at least one node uses Radio Resource Control (RRC) signaling to convey the information to the UE prior to or in conjunction with switching the UE from RRC_CONNECTED state to RRC_INACTIVE or RRC_IDLE state, wherein the at least one node uses a RRCConnectionRelease message to convey the information to the UE and wherein the information is also provided in system information (SI).

27. The radio network of claim 26, wherein the at least one node is a radio network node and is a gNodeB (gNB).

28. The radio network of claim 26, wherein the cell is served by a radio network node, wherein the window periodicity has a value equal to a smallest SS Burst Set recurrence period among the cell served by the radio network node and involved neighboring cells, the window offset is smaller than the window periodicity and the window duration is smaller than or equal to the configured window periodicity.

29. The radio network of claim 26, wherein the window periodicity has a value selected within the group consisting of 5, 10, 20, 40, 80 and 160 milliseconds.

30. The radio network of claim 26, wherein there are repetitive measurement windows covering time intervals when the SS Blocks are transmitted in a vicinity of the UE and the measurement window covers an SS Burst.

31. The radio network of claim 26 wherein the measurement window covers an SS Burst Set, the window offset is in relation to the start of the SS Burst Set of a current serving cell and the window duration is the union of SS Burst Sets of the current serving cell and involved neighboring cells.

32. The radio network of claim 26, wherein the cell is served by a radio network node, wherein the processing circuitry of the radio network node is further configured to obtain beam sweep configurations of inter-radio network node synchronization accuracy from neighbor radio network nodes.

33. The radio network of claim 32, wherein the beam sweep configurations comprise:

a number of beams in an SS Burst,
a number of SS Bursts in an SS Burst Set,
an inter-SS Burst interval, and
at least an approximation of an SS Burst Set recurrence period of the neighbor radio network nodes, and wherein the configuration parameters for the measurement window are based on:

the inter-radio network node synchronization accuracy,
the number of beams in an SS Burst,
the number of SS Bursts in an SS Burst Set,
the inter-SS Burst interval, and
the SS Burst Set recurrence period of the neighbor radio network nodes.

34. The radio network of claim 26, wherein the measurement window is divided in a plurality of sub-windows and the information comprises further configuration parameters for the measurement window including a sub-window duration parameter and a sub-window repetition periodicity parameter.

* * * * *

UNITED STATES PATENT AND TRADEMARK OFFICE
CERTIFICATE OF CORRECTION

PATENT NO. : 11,659,458 B2  
APPLICATION NO. : 17/466564  
DATED : May 23, 2023  
INVENTOR(S) : Ramachandra et al.

Page 1 of 2

It is certified that error appears in the above-identified patent and that said Letters Patent is hereby corrected as shown below:

In the Specification

In Column 1, Lines 4-5, delete "35 U.S.C. S.119(E) & 37 C.F.R. S.1.78" and insert -- 35 U.S.C. § 119(E) & 37 CFR § 1.78 --, therefor.

In Column 1, Lines 48-49, delete "(SNR)/Signal to Interference and Noise Radio (SINR)," and insert -- (SNR)/Signal to Interference plus Noise Ratio (SINR), --, therefor.

In Column 1, Line 49, delete "(e.g. >g GHz)." and insert -- (e.g. > GHz). --, therefor.

In Column 1, Line 64, delete "transmit" and insert -- to transmit --, therefor.

In Column 7, Line 12, delete "is schematic" and insert -- is a schematic --, therefor.

In Column 7, Line 38, delete "starts" and insert -- start --, therefor.

In Column 9, Line 19, delete "On FIG." and insert -- In FIG. --, therefor.

In Column 11, Line 18, delete "laptop embedded equipped (LEE)," and insert -- laptop embedded equipment (LEE), --, therefor.

In Column 12, Line 8, delete "WiMax," and insert -- WiMAX, --, therefor.

In Column 12, Line 57, delete "Read Only Memory" and insert -- Read-Only Memory --, therefor.

In Column 12, Line 60, delete "and/or or any" and insert -- and/or any --, therefor.

In Column 13, Line 59, delete "node s" and insert -- nodes --, therefor.

Signed and Sealed this  
Twenty-eighth Day of November, 2023

Katherine Kelly Vidal  
*Director of the United States Patent and Trademark Office*

CERTIFICATE OF CORRECTION (continued)
U.S. Pat. No. 11,659,458 B2

In Column 14, Line 15, delete "remote RF unit (RRU)," and insert -- Remote Radio Unit (RRU), --, therefor.

In Column 14, Line 62, delete "Read Only Memory" and insert -- Read-Only Memory --, therefor.

In Column 14, Line 65, delete "and/or or any" and insert -- and/or any --, therefor.

In Column 15, Line 62, delete "node s." and insert -- nodes. --, therefor.

In Column 15, Line 67, delete "node s." and insert -- nodes. --, therefor.

In Column 16, Line 48, delete "Read Only Memory" and insert -- Read-Only Memory --, therefor.

In Column 16, Line 51, delete "and/or or any" and insert -- and/or any --, therefor.

In Column 19, Line 47, delete "node s." and insert -- nodes. --, therefor.

In Column 19, Line 52, delete "node s." and insert -- nodes. --, therefor.

In Column 19, Line 58, delete "node s." and insert -- nodes. --, therefor.

In the Claims

In Column 21, Line 12, in Claim 8, delete "The UE of any one of claim" and insert -- The UE of claim --, therefor.

In Column 24, Line 5, in Claim 31, delete "claim 26" and insert -- claim 26, --, therefor.